US007285991B2

(12) United States Patent
Yamashita

(10) Patent No.: US 7,285,991 B2
(45) Date of Patent: *Oct. 23, 2007

(54) SEMICONDUCTOR DEVICE FOR CONTROLLING SWITCHING POWER SUPPLY AND SWITCHING POWER SUPPLY UNIT USING THE SAME

(75) Inventor: Tetsuji Yamashita, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/258,128

(22) Filed: Oct. 26, 2005

(65) Prior Publication Data

US 2006/0092671 A1    May 4, 2006

(30) Foreign Application Priority Data

Nov. 2, 2004    (JP)    ............................ 2004-318633

(51) Int. Cl.
*H03K 3/023*    (2006.01)
(52) U.S. Cl. ........................ 327/108; 327/110; 323/285
(58) Field of Classification Search ........ 327/108–111, 327/376–379, 389; 323/284, 285
See application file for complete search history.

(56) References Cited

U.S. PATENT DOCUMENTS 6,134,123 A * 10/2000 Yamada .................. 363/21.13

6,320,763 B2 * 11/2001 Hosotani .................... 363/16
6,812,682 B2 * 11/2004 Hachiya .................... 323/284
6,960,906 B2 * 11/2005 Yamashita ................. 323/285
7,208,985 B2 *  4/2007 Yamashita ................. 327/108

FOREIGN PATENT DOCUMENTS

JP    08289542 A    11/1996

* cited by examiner

*Primary Examiner*—Kenneth B. Wells
*Assistant Examiner*—Hai L. Nguyen
(74) *Attorney, Agent, or Firm*—Steptoe & Johnson LLP

(57) ABSTRACT

A semiconductor device for controlling a switching power supply is provided, which can reduce power consumption at a light load of the switching power supply and improve the efficiency of the power supply. During the intermittent switching operation of a switching element, when a return signal is outputted from a light load detection circuit within the set time of a transformer reset detection time setting circuit during intermittent stop, the switching operation of the switching element is restarted in response to a transformer reset signal from the transformer reset detection circuit after the return signal is outputted. When the return signal is outputted from the light load detection circuit during the intermittent stop after the set time of the transformer reset detection time setting circuit, the switching operation of the switching element is restarted regardless of the transformer reset signal only in response to the output of the return signal.

9 Claims, 11 Drawing Sheets

STATE OF OUTPUT VOLTAGE VO1 OF COMPARATOR 30

SEMICONDUCTOR DEVICE FOR CONTROLLING SWITCHING POWER SUPPLY AND SWITCHING POWER SUPPLY UNIT USING THE SAME

FIELD OF THE INVENTION

The present invention relates to a semiconductor device for controlling a switching power supply whereby the output voltage of the switching power supply is controlled by a switching operation, and to a switching power supply unit using the same.

BACKGROUND OF THE INVENTION

Conventionally, switching power supply units having semiconductor devices for controlling switching power supplies are widely used as power supplies for home appliances such as home electrical products, thereby to improve power efficiency with low power consumption. In the semiconductor device, an output voltage is controlled (stabilized) by using the switching operation of a semiconductor (a switching element such as a transistor).

Particularly in recent years, in view of the prevention of global warming, attention has focused on a reduction of power consumption in a standby state of appliances such as home electrical products and thus switching power supply units achieving lower power consumption during standby are in great demand.

In order to meet the demand, a power supply system or the like is developed for properly using two switching power supply units according to an operation mode of an appliance. For example, a switching power supply unit for a main power supply is provided to supply power at rated load in a normal operation (normal mode) of the appliance, and a switching power supply unit only for a standby state is separately provided to supply power during standby in a standby operation (standby mode) of the appliance. When the appliance is in a standby state, power is supplied from the switching power supply unit only for a standby state. At rated load, power is supplied from the switching power supply for the main power supply.

However, this power supply system requires two switching power supply units (converters), increasing the cost of the overall circuit including the semiconductor device for controlling the switching power supply. Therefore, when lower cost is strongly demanded, a power supply system comprising a single switching power supply unit (converter) is used in many cases. In this case, switching power supply units of partial resonance have been frequently used in view of efficiency of power supplies and noise.

In such a semiconductor device for controlling a switching power supply, a current applied to a switching element is reduced at light load, e.g., during standby. However, it is always necessary to supply, via a transformer, the internal circuit current of the semiconductor device for controlling the switching power supply. Therefore, it is not possible to reduce a current flowing to the switching power supply, including a current flowing to the switching element, to 0 and thus a certain amount of current is applied even at no load. Hence, the switching operation of the switching element causes a loss even at no load and a lighter load causes a larger loss in the switching element. Consequently, the switching power supply decreases in power efficiency and thus it is not possible to meet the need for lower power consumption in a standby state of the power supply.

As described above, the switching power supply of partial resonance has the following problem: since the switching power supply generally has a high oscillation frequency at light load, a switching loss considerably increases and the efficiency of the power supply decreases in a standby mode.

As a solution for the low efficiency of a power supply in a standby mode (e.g., Japanese Patent Laid-Open No. 2002-315333), the following controlling technique is available: a state of a load on the secondary side of the power supply is detected by a microcomputer, the power supply shifts to a standby mode in response to the signal, and intermittent oscillation occurs due to feedback control according to a commercial frequency. In this case, in order to improve the efficiency of the power supply in a standby mode, feedback control is performed by the microcomputer as follows: when an output voltage increases to a predetermined value or higher at light load, the switching operation of a switching element is stopped, and then when the output voltage decreases to the predetermined value or lower, the switching operation of the switching element is restarted.

DISCLOSURE OF THE INVENTION

However, in such a conventional switching power supply unit, an oscillation frequency is constant regardless of load conditions in an intermittent switching operation at light load. Thus, it is not possible to sufficiently reduce the current loss of the switching element at light load or obtain sufficiently high power efficiency over a wide load area including a standby mode, thereby interfering with low cost and improvement in the efficiency of the switching power supply.

The present invention is devised to solve the conventional problems and provides a semiconductor device for controlling a switching power supply, which reduces the current loss of a switching element at light load to reduce power consumption at light load, achieves sufficiently high power efficiency with ease over a wide load area including a standby mode, and further improves the efficiency of the switching power supply at low cost.

In order to solve the problems described above, a semiconductor device for controlling a switching power supply of the present invention is used for a switching power supply unit in which a direct-current input voltage is applied to a switching element via a primary winding of a transformer, a direct-current voltage obtained by rectifying and smoothing an alternating current generated in a secondary winding of the transformer is controlled by the switching operation of the switching element, and power is supplied to a load, the semiconductor device controlling the switching operation of the switching element, the semiconductor device comprising a control circuit having a transformer reset detection circuit for detecting a reset state of the transformer from an alternating voltage generated in a tertiary winding of the transformer and outputting a transformer reset detection signal indicating the reset state, the reset state being generated by the switching operation of the switching element, an IV converter for converting into a voltage a current value of control current indicating a change of a direct-current voltage based on the alternating current generated in the secondary winding of the transformer, and a light load detection circuit for outputting, when detecting a light load as a load condition indicating power supply to the load according to a change of an output voltage from the IV converter, a control signal for controlling an intermittent operation of switching performed by the switching element, wherein the control electrode of the switching element is driven and the intermittent operation is controlled based on the transformer reset detection signal from the transformer reset detection circuit and the control signal from the light load detection circuit, the light load detection circuit outputs the control signal for controlling the intermittent operation so as to stop the switching operation of the switching element when the output voltage from the IV converter is lower than the light load detection lower limit voltage for detecting the light load, and restart the switching operation of the switching element when the output voltage from the IV converter is higher than the light load detection lower limit voltage for detecting the light load, the control circuit comprises a transformer reset detection time setting circuit for setting a time of the effective period of the transformer reset detection signal from the transformer reset detection circuit, starting from the stop of the switching operation in response to the control signal from the light load detection circuit, and switching on control unit for controlling the timing of switching on at the restart of the switching operation based on the relationship between the transformer reset detection setting time of the transformer reset detection time setting circuit and the timing of the restart of the switching operation in response to the control signal from the light load detection circuit, and the switching on control unit turns on, when the control signal indicating the restart of the switching operation is outputted from the light load detection circuit within the transformer reset detection setting time of the transformer reset detection time setting circuit, switching at the restart of the switching operation in response to the transformer reset detection signal from the transformer reset detection circuit after the control signal is outputted.

According to the semiconductor device for controlling the switching power supply of the present invention, when the control signal indicating the restart of the switching operation is outputted from the light load detection circuit after the transformer reset detection setting time of the transformer reset detection time setting circuit, the switching on control unit turns on switching at the restart of the switching operation only when the control signal is outputted.

According to the semiconductor device for controlling the switching power supply of the present invention, the transformer reset detection setting time of the transformer reset detection time setting circuit is determined as the optimum time for a used load based on the drain voltage waveform of the switching element during the stop period of the switching operation.

According to the semiconductor device for controlling the switching power supply of the present invention, a state kept after the transformer reset detection setting time of the transformer reset detection time setting circuit is reset in response to an output signal for driving the control electrode of the switching element.

According to the semiconductor device for controlling the switching power supply of the present invention, the transformer reset detection time setting circuit sets the transformer reset detection setting time according to the capacitance value of a capacitor and outputs the timing of the transformer reset detection setting time via an RS flip-flop.

The semiconductor device for controlling the switching power supply of the present invention further comprises a time changing terminal for arbitrarily setting the transformer reset detection setting time of the transformer reset detection time setting circuit.

The semiconductor device for controlling the switching power supply of the present invention further comprises a capacitor for arbitrarily setting the transformer reset detection setting time of the transformer reset detection time setting circuit, the capacitor being connected between the time changing terminal and a ground.

According to the semiconductor device for controlling the switching power supply of the present invention, the switching element and the control circuit are integrated on the same semiconductor substrate, and the semiconductor device comprises, as external connection terminals on the semiconductor substrate, at least a switching element input terminal for inputting the input voltage to the switching element via the primary winding of the transformer, a switching element output terminal for outputting a switching current obtained by the switching operation of the switching element, a power supply terminal for supplying a direct-current voltage to the control circuit in response to the switching operation of the switching element according to a current generated in the tertiary winding of the transformer, a control terminal for inputting a control signal for controlling an intermittent operation of switching performed by the switching element, and a transformer reset detection terminal for applying a signal for transformer reset detection to the transformer reset detection circuit.

According to a switching power supply unit of the present invention, a direct-current voltage obtained by rectifying and smoothing an alternating current generated on the secondary winding of the transformer is controlled and power is supplied to a load by applying a direct-current input voltage to the switching element via the primary winding of the transformer and controlling the switching element by means of the semiconductor device for controlling the switching power supply to perform a switching operation.

As described above, during the stop period of the intermittent operation, when a return control signal is outputted from the light load detection circuit within the predetermined set time of the transformer reset detection time setting circuit, the switching power supply is controlled so as to turn on the switching element according to the timing of the waveform of the transformer reset detection signal after the return control signal is outputted, so that a switching power loss caused by a resonant capacitor can be reduced during the intermittent switching operation at light load.

Thus, it is possible to reduce a current loss of the switching element at light load and thereby to further reduce power consumption at light load, easily obtain sufficiently high power efficiency over a wide load area including a standby mode, and further improve the efficiency of the switching power supply at low cost.

The semiconductor device for controlling the switching power supply of the present invention makes it possible to reduce a current loss of the switching element at light load and thereby to further reduce power consumption at light load, easily obtain sufficiently high power efficiency over a wide load area including a standby mode, and further improve the efficiency of the switching power supply at low cost. The semiconductor device can be effectively applied to a AC-DC switching power supply or the like for converting an alternating power supply from a commercial power supply to a direct-current power supply required for an appliance, and thus is industrially applicable.

DESCRIPTION OF THE EMBODIMENTS

Referring to the accompanying drawings, the following will specifically describe a semiconductor device for controlling a switching power supply according to embodiments of the present invention.

Embodiment 1

A semiconductor device for controlling a switching power supply will be discussed below according to Embodiment 1 of the present invention.

Figure 1:
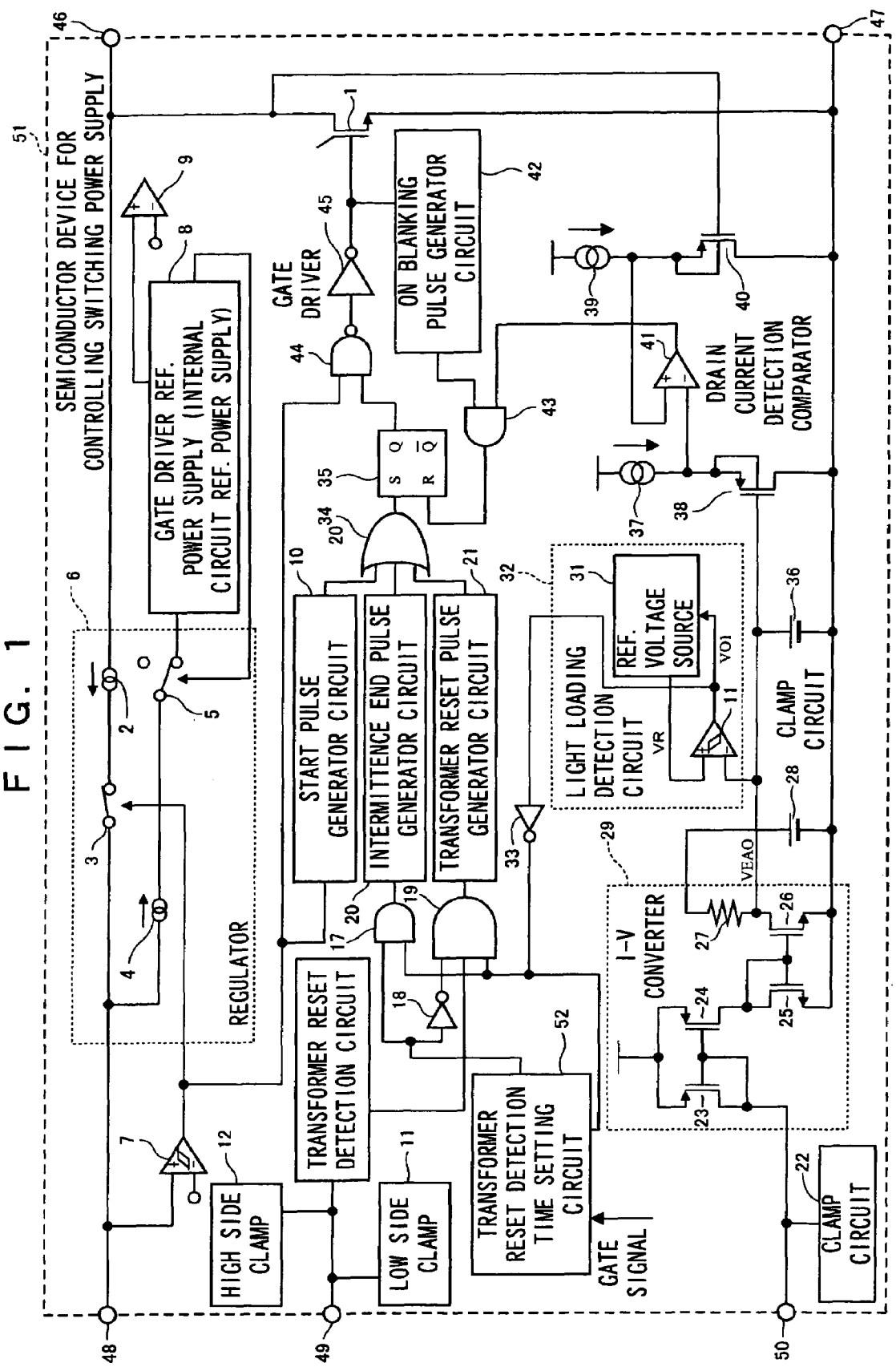
FIG. 1 is a circuit diagram showing a structural example of a semiconductor device for controlling a switching power supply according to Embodiment 1 of the present invention.
Figure 2:
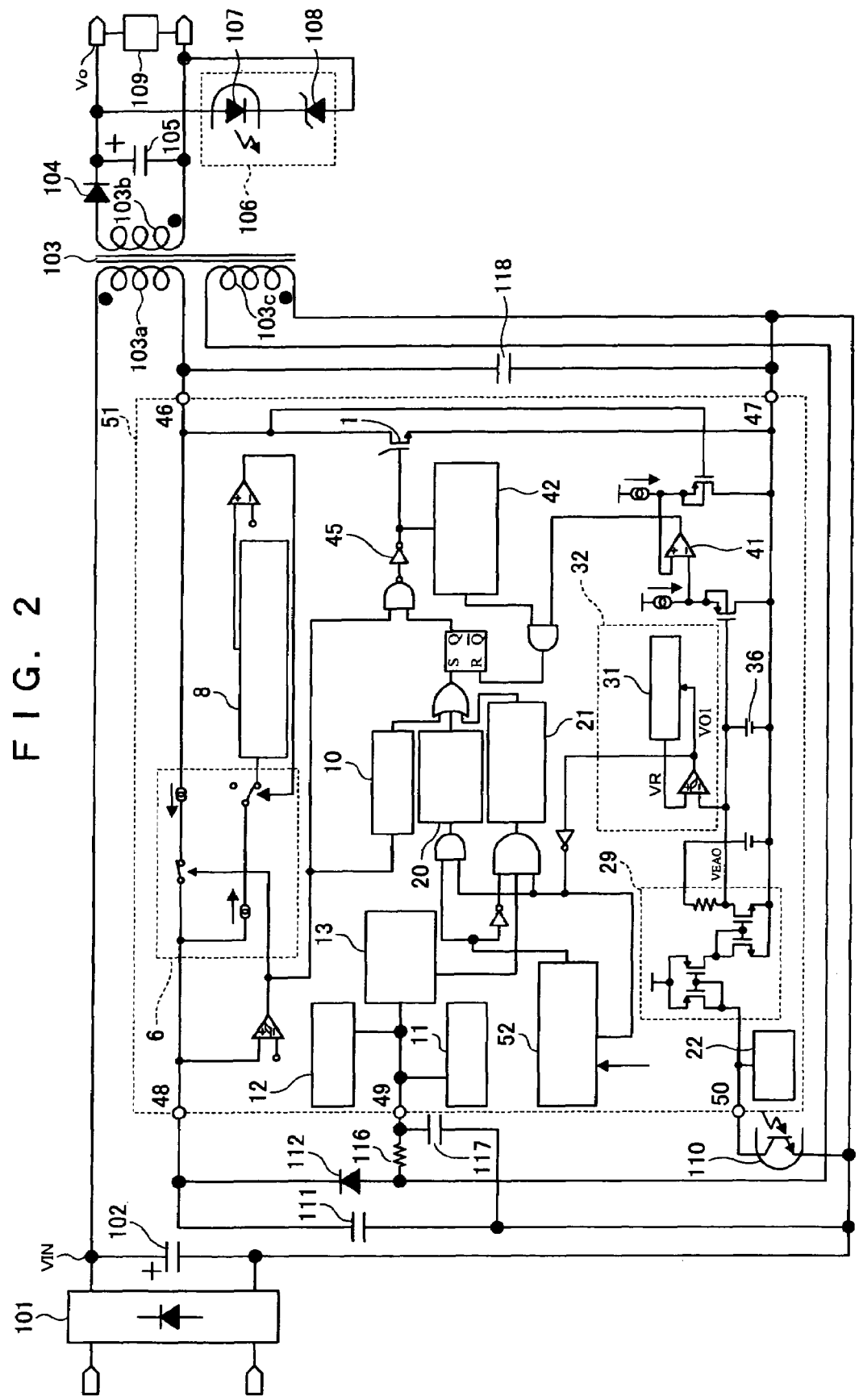
FIG. 2 is a circuit diagram showing a structural example of a switching power supply unit including the semiconductor device for controlling the switching power supply of Embodiment 1.

FIG. 1 is a circuit diagram showing a structural example of the semiconductor device for controlling the switching power supply of Embodiment 1. FIG. 2 is a circuit diagram showing a structural example of a switching power supply unit comprising the semiconductor device for controlling the switching power supply of Embodiment 1.

A semiconductor device 51 for controlling the switching power supply shown in FIG. 1 comprises a light load detection circuit 32 fed with an output voltage VEAO, which is obtained by converting a current applied from a control terminal 50 into a voltage by means of an IV converter 29. The light load detection circuit 32 comprises a light load detecting comparator 30. The output voltage VEAO from the IV converter 29 is applied as the minus input of the light load detecting comparator 30, and a reference voltage VR outputted from a reference voltage source 31 is applied as the plus input of the light load detecting comparator 30. The light load detecting comparator 30 compares the inputted output voltage VEAO and reference voltage VR. When the output voltage VEAO falls below the reference voltage VR, the light load detecting comparator 30 outputs a predetermined output signal VO1 to AND circuits 17 and 19 and a transformer reset detection time setting circuit 52 through an inverter 33. The transformer reset detection time setting circuit 52 sets a time of an effective period of a transformer reset detection signal from a transformer reset detection circuit 13 during intermittent stop, starting from the timing of the intermittent stop. The output signal VO1 of the light load detecting comparator 30 is also applied to the reference voltage source 31. The reference voltage source 31 changes the output voltage VR in response to the output signal VO1 of the light load detecting comparator 30.

A transformer reset detection signal is applied to the AND circuit 19 as a clock signal, which is another input signal. The clock signal is outputted from the transformer reset detection circuit 13 after the detection of the voltage of a transformer reset detecting terminal 49. The output of the AND circuit 19 is applied to the transformer reset pulse generator circuit 21 for generating a transformer reset pulse of one-shot pulse. When a light load is detected, that is, when a switching element 1 is stopped, the amplitude of resonance is reduced according to a stop period and thus a transformer reset signal may not be detected. For this reason, the transformer reset pulse generator circuit 21 is not operated.

The output VO1 of the light load detecting comparator 30 is inputted to an intermittent end pulse generator circuit 20 via the inverter 33 and the AND circuit 17. After the stop period, the output of the intermittent end pulse generator circuit 20 is inputted to an OR circuit 34 and the output signal of the OR circuit 34 is inputted as the set signal of an RS flip-flop 35. The output signal of the RS flip-flop 35 is inputted to an NAND circuit 44 and the output of the NAND circuit 44 is outputted to the gate of the switching element (power MOSFET) 1 via a gate driver 45. In this way, when the light load detecting comparator 30 detects a light load, which is a standby state, the transformer reset detection circuit 13 is not operated. Switching control is performed so as to restart the switching of the switching element 1 in response to the output signal of the intermittent end pulse generator circuit 20.

In the semiconductor device 51 for controlling a switching power supply, a switching element 1 including a power MOSFET and a control circuit for performing switching control on the switching element 1 are integrated on the same semiconductor substrate. The semiconductor device 51 comprises five terminals: an input terminal 46 and an output terminal 47 of the switching element 1, a starting voltage detecting terminal of the semiconductor device 51 for controlling the switching power supply, a power supply terminal 48 of the control circuit, the control terminal 50 for inputting a control signal, and the voltage detecting terminal (transformer reset detecting terminal) 49 of a bias winding (tertiary winging) of a transformer 103.

A regulator 6 is connected between the input terminal 46 of the switching element 1, the starting voltage detecting terminal 48, the control circuit, and a gate driver reference power supply (internal circuit reference voltage) 8. When a voltage of the input terminal 46 of the switching element 1 is equal to or higher than a fixed voltage, control is performed such that the internal circuit current of the semiconductor device 51 for controlling the switching power supply is supplied and a comparator 9 causes the control circuit and the gate driver reference power supply 8 of the semiconductor device 51 for controlling the switching power supply to have the fixed voltage.

The output of a start/stop circuit comparator 7 is inputted to an NAND circuit 44 and the output signal of the NAND circuit 44 is outputted to the gate of the switching element 1 via the gate driver 45. The oscillation and stop of the switching element 1 are controlled according to the voltage of the terminal 48.

Reference numeral 22 denotes a clamp circuit which is connected to the control terminal 50 and is set at a constant voltage because a phototransistor 110 and so on are connected to the outside of the semiconductor device 51 for controlling the switching power supply.

Reference numeral 29 denotes the IV converter which internally converts a current applied from the control terminal 50 into a voltage. A high-side clamp circuit 12 and a low-side clamp circuit 11 are connected to the terminal 49 for detecting the voltage of a bias winding 103c of the transformer 103 and regulate a voltage inputted into the semiconductor device 51 for controlling the switching power supply. These clamp circuits are not always necessary. The transformer reset detection circuit 13 is connected to the terminal 49, and the one-shot pulse (transformer reset pulse) generator circuit 21 determines the timing of the turn-on signal of the switching element 1.

Reference numeral 10 denotes a start pulse generator circuit which generates an output in response to the output signal, that is, the start signal of the comparator 7. The output signal is inputted to the set terminal of an RS flip-flop 35 via the OR circuit 34 and an output Q of the RS flip-flop 35 is inputted to the NAND circuit 44.

The output signal Q of the RS flip-flop 35 is set at H by the start pulse signal after startup and the one-shot (transformer reset) pulse signal during a normal operation via the OR circuit 34, and the switching element 1 is turned on.

After the switching element 1 is turned on, a voltage generated by a current applied to the switching element 1 and the on-resistance of the switching element 1, that is, an on voltage is inputted to the plus side of a drain current detecting comparator 41. When the voltage is higher than the voltage of the minus side, the voltage is inputted as the reset signal of the RS flip-flop 35 via an AND circuit 43 connected to an on blanking pulse generator circuit 42, and the switching element 1 is turned off. That is, a drain current is regulated by detecting the on resistance of the switching element 1.

Further, a voltage generated by a constant-current source 37 and a P-type MOSFET 38 is applied to the minus side of the drain current detecting comparator 41 based on the output voltage VEAO which has been internally converted by the IV converter 29 according to a current applied from a clamp circuit 36 and the control terminal 50. The upper limit (maximum drain current) of a drain current is regulated by the clamp circuit 36, so that the drain current of the switching element 1 can be changed according to the level of the output voltage VEAO from the IV converter 29. In other words, since the output voltage VEAO of the IV converter 29 decreases with current applied from the control terminal 50, the voltage of the drain current detecting comparator 41 decreases on the minus side, so that the drain current of the switching element 1 decreases.

In this way, the on/off period of the switching element 1 is determined, in response to the one-shot pulse signal having been generated by the transformer reset pulse generator circuit 21, based on the output voltage VEAO having been converted by the IV converter 29 according to a current passing from the control terminal 50 and the turn-on timing signal of the switching element 1. The timing signal has been detected by the transformer reset detection circuit 13 from the waveform of the voltage applied to the terminal 49 from the bias winding 103c of the transformer 103.

In this switching power supply unit, a commercial AC power supply is rectified by a rectifier 101 such as a diode bridge and smoothed by an input capacitor 102, so that a direct-current voltage VIN is generated and applied to the transformer 103 for power conversion. The transformer 103 for power conversion has a primary winding 103a, a secondary winding 103b, and the tertiary winding (used as a bias winding) 103c. The direct-current voltage VIN is applied to the primary winding 103a.

The direct-current voltage VIN having been applied to the primary winding 103a of the transformer 103 is switched by the switching element 1 in the semiconductor device 51 for controlling the switching power supply. Current is drawn to the secondary winding 103b of the transformer 103 by the switching operation of the switching element 1. The current having been drawn to the secondary winding 103b is rectified and smoothed by a diode 104 and a capacitor 105, which are connected to the secondary winding 103b, and the current is supplied to a load 109 as the direct-current power of an output voltage Vo.

For example, an output voltage detection circuit 106 comprising an LED 107 and a Zener diode 108 is connected across the capacitor 105 and outputs a feedback signal for stabilizing the output voltage Vo to the primary-side phototransistor 110 connected to the control terminal 50 of the semiconductor device 51 for controlling the switching power supply.

The tertiary winding 103c of the transformer 103 is connected to the transformer reset detecting terminal (bias winding voltage detecting terminal) 49 via a resistor 116 and to the starting voltage detecting terminal 48 via a diode 112. A capacitor 111 prevents a sharp decrease on the terminal 48, that is, stabilizes the terminal 48. The resistor 116 and a capacitor 117, which are connected to the terminal 49, generate a delay time and adjust the time when the transformer reset detection circuit 13 detects the transformer reset signal from the waveform voltage applied to the terminal 49. A capacitor 118 connected between the input and output terminals 46 and 47 of the switching element 1 determines the magnitude and period of ringing caused by resonance with the transformer 103.

As described above, by intermittent control at light load, it is possible to reduce a switching loss caused by the switching element 1 and improve the efficiency of the power supply at light load. In the conventional example, regardless of the state of the load, switching is restarted by a return pulse (intermittent stop end pulse) in response to the return signal of an intermittent operation.

When the internal power MOSFET serving as the switching element 1 is stopped (turned off) in the intermittent operation, due to resonance caused by L (inductance) on the primary side of the transformer and a capacitance between D and S (a sum of the capacitance of a MOS and an external capacitance), ringing occurs on the drain voltage of the switching element 1.

When a load is considerably reduced and the intermittent operation is stopped for a long time, ringing decreases and the drain voltage is equal to a voltage around the center of oscillation. When the power MOSFET 1 is turned on by the return signal, the capacitance between D and S causes a large loss. The loss is expressed by $CV^2/2$. When the level of the drain voltage is high or a capacitance C is large, the loss becomes significantly large. However, when the stop period is long, a switching loss is considerably reduced by the long stop period, artificial (partial) resonance occurs, and the MOSFET 1 is turned on at the bottom (0 V) of the drain voltage after return, so that the loss expressed by $CV^2/2$ becomes negligible. That is, a loss is caused by the drain voltage and the external capacitor only at the first ringing wave after the return of the intermittent operation.

However, when the stop period of intermittence is so short that stop and return are repeated in a short time, the loss expressed by $CV^2/2$ becomes extremely large. Even if the intermittent operation is controlled to improve the efficiency of the power supply at light load, the loss may increase.

Thus, as shown in FIG. 1, according to a time serving as the effective period of the transformer reset detection signal from the transformer reset detection circuit 13, that is, an intermittent stop signal from the light load detection circuit 32, the transformer reset detection time setting circuit 52 is operated from the time when the switching operation of the switching element (power MOSFET) 1 is stopped by an intermittent operation. When an intermittent return signal is outputted within the time serving as the effective period of the transformer reset detection signal set by the transformer reset detection time setting circuit 52, the switching element (power MOSFET) 1 is not turned on in response to the switching return signal. The transformer reset detection signal having been inputted from the transformer reset detection circuit 13 after the return signal is made effective, and then the switching element (power MOSFET) 1 is turned on according to the timing of the transformer reset detection signal.

This control is effective when return and stop are repeated in a short time during the intermittent operation. With this control, even when ringing does not decrease so much within the time set by the transformer reset detection time setting circuit 52 from an intermittent stop, the switching element 1 can be turned on at the bottom of the drain voltage, thereby further reducing the loss expressed by $CV^2/2$.

The transformer reset detection time setting circuit 52 is reset when the output of the gate driver 45 is H after return. Thus, it is possible to fix the output of the transformer reset detection time setting circuit 52 until the switching element (power MOSFET) 1 is turned on after return.

The following will discuss operations performed at light load by the semiconductor device 51 configured thus for controlling the switching power supply, and the operations of the switching power supply unit. The switching power supply unit is a ringing choke converter (RCC) using partial resonance and is a structural example for explaining Embodiment 1.

Figure 3:
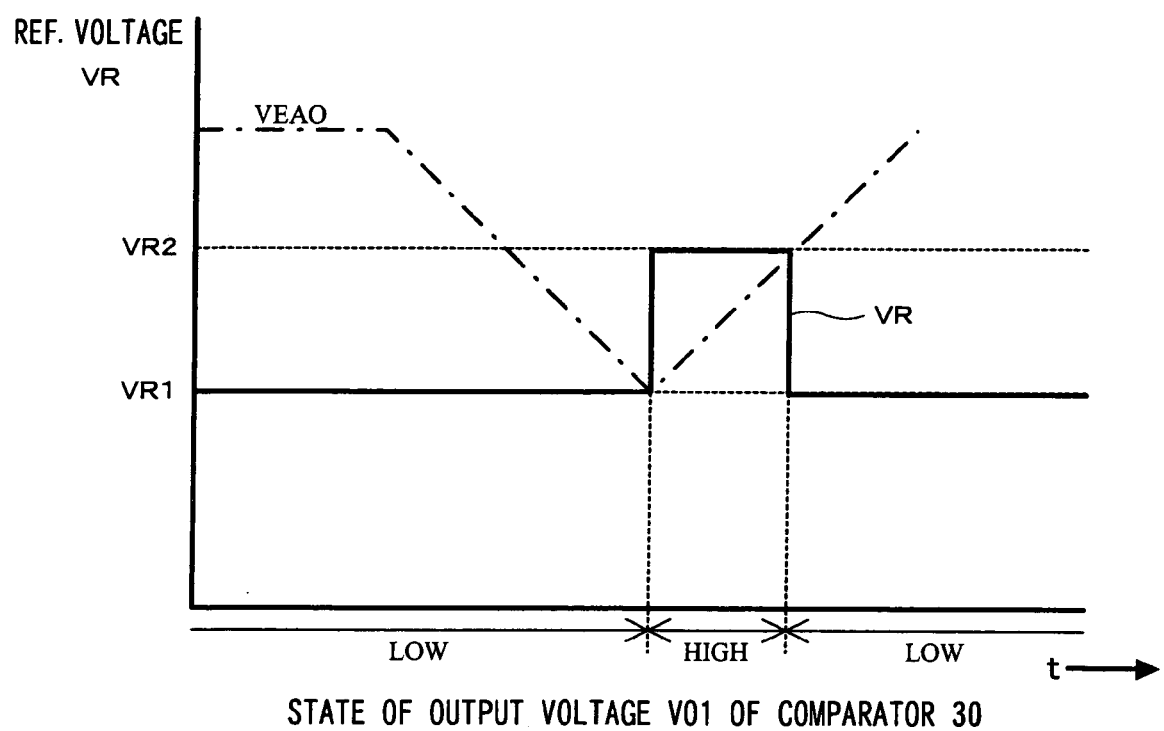
FIG. 3 is a time chart for explaining operations of a reference voltage source in the semiconductor device for controlling the switching power supply of Embodiment 1.
Figure 4:
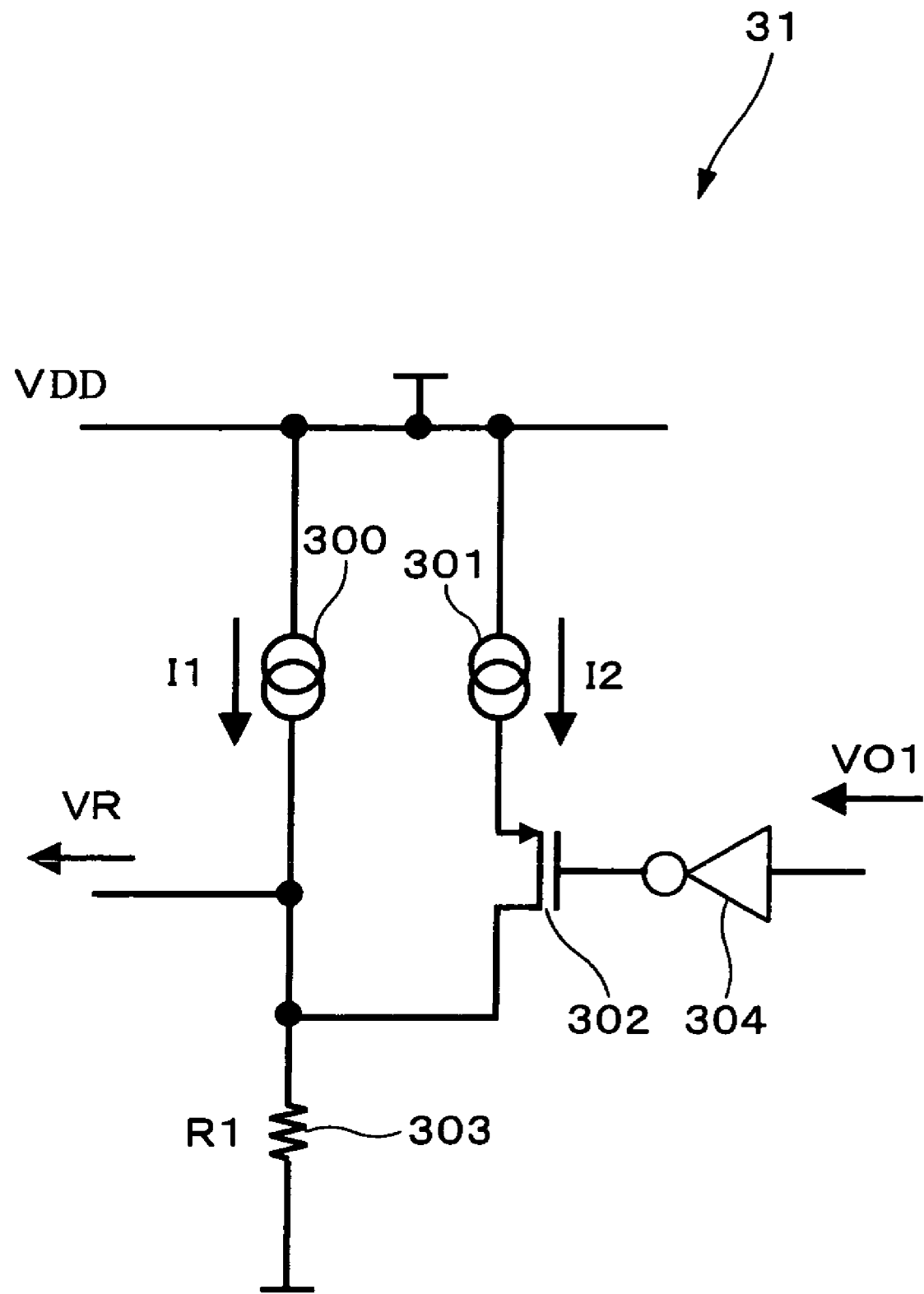
FIG. 4 is a circuit diagram showing a structural example of an internal circuit of a reference voltage source in the semiconductor device for controlling the switching power supply of Embodiment 1.
Figure 5:
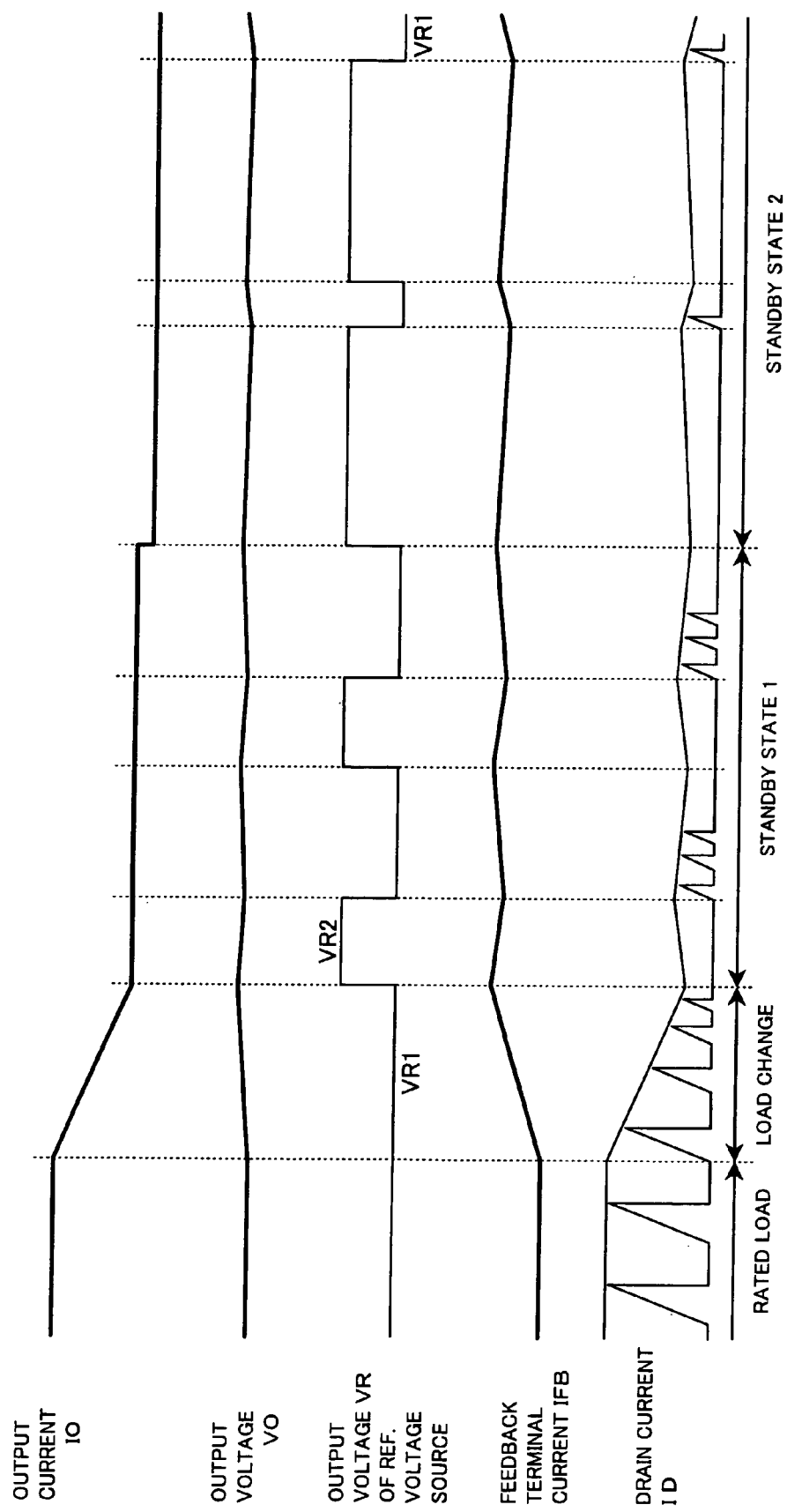
FIG. 5 is a time chart for explaining operations of the semiconductor device for controlling the switching power supply of Embodiment 1 and the switching power supply unit comprising the semiconductor device for controlling the switching power supply of Embodiment 1.

FIG. 3 is a time chart for explaining the operations of a reference voltage source in the semiconductor device for controlling the switching power supply according to Embodiment 1. FIG. 4 is a circuit diagram showing a structural example of the internal circuit of the reference voltage source in the semiconductor device for controlling the switching power supply according to Embodiment 1. FIG. 5 is a time chart for explaining the operations of the semiconductor device for controlling the switching power supply of Embodiment 1 and the switching power supply unit comprising the semiconductor device for controlling the switching power supply.

When an AC power supply is inputted from a commercial power supply to the rectifier 101, the power supply is rectified and smoothed by the rectifier 101 and the capacitor 102 and is converted into the direct-current voltage VIN. The direct-current voltage VIN is applied to the primary winding 103a of the transformer 103. When the direct-current voltage VIN is equal to or higher than a certain value, charging current is applied to the capacitor 111 via the regulator 6 in the semiconductor device 51 for controlling the switching power supply. When the voltage of the terminal 48 of the semiconductor device 51 for controlling the switching power supply reaches a starting voltage set by the start/stop comparator 7, control is started for the switching operation of the switching element 1.

A start pulse is generated by a start pulse generator circuit 10 based on the output signal of the start/stop comparator 7 and the switching element 1 is turned on. Since the secondary side has a low output upon startup, no current is applied to the Zener diode 108 of the output voltage detection circuit 106, and thus no current is applied to the phototransistor 110. Therefore, the output voltage VEAO of the IV converter 29 has a higher level than the clamp circuit 36 and the minus side of the drain current detecting comparator 41 is set at a voltage determined by the clamp circuit 36. When a start pulse is generated by the start pulse generator circuit 10 and the switching element 1 is turned on, a current is applied to the switching element 1 and an on voltage determined by a product of an on resistance is inputted to the plus side of a drain current detecting comparator 41. When the on voltage exceeds a voltage determined on the minus side, H is inputted to the reset terminal signal of the RS flip-flop 35 and the switching element 1 is turned off.

Thereafter, the voltage of the tertiary winding (bias winding) 103c of the transformer 103 is changed from positive to negative, that is, the input terminal 46 of the switching element 1 decreases in voltage due to resonance determined by the inductance of the primary side 103a of the transformer 103 and a capacitance between input and output of the capacitor 118 and the switching element 1. At this point, a one-shot pulse signal is inputted as H by the transformer reset detection circuit 13 from the transformer reset pulse generator circuit 21 to the set terminal of the RS flip-flop 35 via the OR circuit 34, and the switching element 1 is turned on.

The detection time of the transformer reset detection circuit 13 is adjusted by the resistor 116 and the capacitor 117 which are connected between the tertiary winding (bias winding) 103c of the transformer 103 and the terminal 49. When the input terminal 46 of the switching element 1 is almost 0 volts, the switching element 1 is turned on.

The output voltage Vo is increased by repeating the above-described switching operation. When the output voltage Vo is equal to or higher than a voltage set by the output voltage detection circuit 106, the LED 107 is brought into conduction, a current is applied to the phototransistor 110, and a current is applied from the control terminal 50 of the semiconductor device 51 for controlling the switching power supply. Since the output voltage VEAO of the IV converter 29 decreases with the applied current, the drain current detecting comparator 41 decreases on the minus side and thus the drain current of the switching element 1 decreases. In this way, the on duty of the switching element 1 is changed to a proper state. That is, switching is turned on by the one-shot pulse outputted from the transformer reset pulse generator circuit 21 in response to the output signal from the transformer reset detection circuit 13, and the on duty of the switching element 1 is determined by the current applied from the control terminal 50.

That is, under light-load conditions where a small amount of current is applied to the load 109, a current IDS is applied to the switching element 1 for a short period. Under heavy-load conditions, the current IDS is applied to the switching element 1 for a long period.

In this way, the semiconductor device 51 for controlling the switching power supply controls the drain current IDS of the switching element 1 and changes the on duty according to power supplied to the load 109 of the switching power supply unit. Timing to turn on the switching element 1 is set so as to produce output when the input voltage of the switching element 1 is reduced to the minimum during resonance, thereby hardly causing a switching loss in a turned-on state. That is, partial resonance is performed so as to make a switching loss negligible in the turned-on state. These operations can realize high efficiency and low noise during normal operations.

The light load detecting comparator 30 compares the output voltage VEAO, which has been obtained by converting a current applied from the control terminal 50 into a voltage by means of the IV converter 29, and the output voltage VR of the reference voltage source 31. The output voltage VR of the reference voltage source 31 first acts as a light load detection lower limit voltage VR1 (rated load in FIG. 5). In a standby state and so on where the load 109 connected to the output of the switching power supply unit decreases in current supply, as current supply to the load increases, the output voltage Vo increases (a load change in FIG. 5) and the current of the phototransistor 110 is increased by the LED 107. This current increases a current applied from the control terminal 50 and thus the converted voltage VEAO of the IV converter 29 decreases according to formula (1) below:

$$VEAO = V0 - R \times I \quad (1)$$

where V0 represents a predetermined reference voltage of a reference voltage source 28, R represents a resistance of a resistor 27, and I represents a value of current passing through the resistor 27. The current is obtained by internal mirror circuits 23 to 26 which convert a current applied from the control terminal 50.

Therefore, according to formula (1), as a current flowing from the control terminal 50 increases, the output voltage VEAO of the IV converter 29 decreases. Accordingly, the reference power supply (minus side) of the drain current detecting comparator 41 decreases, the drain current of the switching element 1 gradually decreases, and power supply to the load 109 also decreases. When the converted voltage VEAO of the IV converter 29 is lower than the light load detection lower limit voltage VR1, a light load is detected and the output signal VO1 of the light load detecting comparator 30 changes from a low level to a high level.

Thus, the output of the AND circuit 19 that has passed through the inverter 33 becomes a low level and the one-shot pulse signal of the transformer reset pulse generator circuit 21 is not outputted, so that the switching operation of the switching element 1 is stopped. At the same time, the output voltage VR of the reference voltage source 31 is changed from the light load detection lower limit voltage VR1 to a light load detection upper limit voltage VR2 in response to the output signal VO1 of the light load detecting comparator 30 (standby state (1) in FIG. 5).

When the switching operation of the switching element 1 is stopped and the switching element 1 is turned off, no current passes through the switching element 1. Accordingly, no power is supplied to the load 109 and thus the output voltage Vo to the load 109 gradually decreases. Therefore, the output voltage VEAO of the IV converter 29 gradually increases. Since the output voltage of the reference voltage source 31 is the light load detection upper limit voltage VR2, which is higher than the light load detection lower limit voltage VR1, the switching operation of the switching element 1 is not immediately restarted as shown in FIG. 3.

As shown in FIG. 3, when the output voltage Vo to the load 109 further decreases and the output voltage VEAO of the IV converter 29 exceeds the light load detection upper limit voltage VR2, the output signal VO1 of the light load detecting comparator 30 becomes a low level. In response to the signal, a signal is outputted from the intermittent end pulse generator circuit 20 through the inverter 33. The switching operation of the switching element 1 is restarted by the output signal. At the same time, the transformer reset detection signal from the transformer reset detection circuit 13 becomes effective. The operation of the transformer reset detection circuit 13 has been made invalid by the AND circuit 19. The turning on/off of normal partial resonance is restarted (rated load in FIG. 5) for the switching element 1 in response to the one-shot pulse output signal of the transformer reset pulse generator circuit 21.

At the same time, as shown in FIG. 3, the output voltage VR of the reference voltage source 31 is changed from the stand by (light load) detection upper limit voltage VR2 to the standby (light load) detection lower limit voltage VR1. When the switching operation of the switching element 1 is restarted, the on-duty of the switching element 1 is larger than that of the detection of a light load. Thus, excessive power is supplied to the load 109, the output voltage Vo to the load increases again, and the output voltage VEAO of the IV converter 21 decreases. When a light load is detected again, the switching operation performed by repeatedly turning on/off the switching element 1 is stopped.

In this way, the output voltage VR from the reference voltage source 31 is changed from the light load detection lower limit voltage VR1 to the light load detection upper limit voltage VR2 by detecting a light load. Thus, during the detection of a standby state, switching control of repeatedly turning on/off the switching element 1 exhibits intermittent oscillation (intermittent switching operation) in which stop and restart are repeated.

The output voltage Vo to the load 109 decreases when the intermittent oscillation is stopped. A degree of reduction depends upon a current supplied to the load 109. That is, the output voltage Vo of the load 109 decreases gently as current consumed by the load 109 decreases, and the stop period of the intermittent oscillation becomes longer as current consumed by the load 109 decreases. Thus, as the load becomes lighter, the switching operations of the switching element 1 decrease.

The reference voltage source 31 shown in FIG. 4 comprises a constant-current source 300 for determining the output voltage VR of the reference voltage source 31, a constant-current source 301, a resistor 303, a switching element 302 such as a P-type MOSFET, and an inverter circuit 304.

The constant-current source 300 supplies a constant current I1 and is connected to the resistor 303. The constant-current source 301 supplies a constant current I2 and is connected to the resistor 303 via the switching element (P-type MOSFET) 302. The output signal VO1 of the light load detecting comparator 30 is inputted to an input terminal such as the gate of the switching element 302 via the inverter circuit 304.

A voltage generated by the constant-current source 300, the constant-current source 301, and the resistor 303 is outputted as the output voltage VR of the reference voltage source 31 and inputted to the plus terminal of the light load detecting comparator 30.

The following will discuss the operations of the light load detection circuit 32 configured thus.

As shown in FIG. 3, before a light load is detected, the output signal VO1 of the light load detecting comparator 30 is set at a low level (LOW) and thus the switching element 302 is turned off. Therefore, the output voltage VR of the reference voltage source 23 at this point, i.e., the light load detection lower limit voltage VR1 is expressed by formula (2) below:

$$VR1 = R1 \times (I1) \qquad (2)$$

On the other hand, when a light load is detected, the output signal VO1 of the light load detecting comparator 30 is set at a high level (HIGH). Thus, the switching element 302 is turned on and the current I2 supplied from the constant-current source 301 also passes through the resistor 303. Therefore, the output voltage VR of the reference voltage source 31 at this point, i.e., the light load detection upper limit voltage VR2 is expressed by formula (3) below:

$$VR2 = R1 \times (I1 + I2) \qquad (3)$$

As shown in FIG. 3, the output voltage VR of the reference voltage source 31 becomes equal to the light load detection lower limit voltage VR1 or the light load detection upper limit voltage VR2 in response to the output signal VO1 of the light load detecting comparator 30, thereby exhibiting intermittent oscillation in a standby state.

In Embodiment 1, the constant current value for setting the output voltage of the reference voltage source 31 is changed in response to the output signal VO1 of the light load detecting comparator 30. A resistance for setting the output voltage of the reference voltage source 31 may be changed in response to the output signal VO1 of the light load detecting comparator 30.

The following will describe operations corresponding to waveforms of a load connected to a direct-current output from the secondary winding 103b of the transformer 103. The state of the load is divided into a rated load state, standby state (1), and standby state (2).

Figure 6:
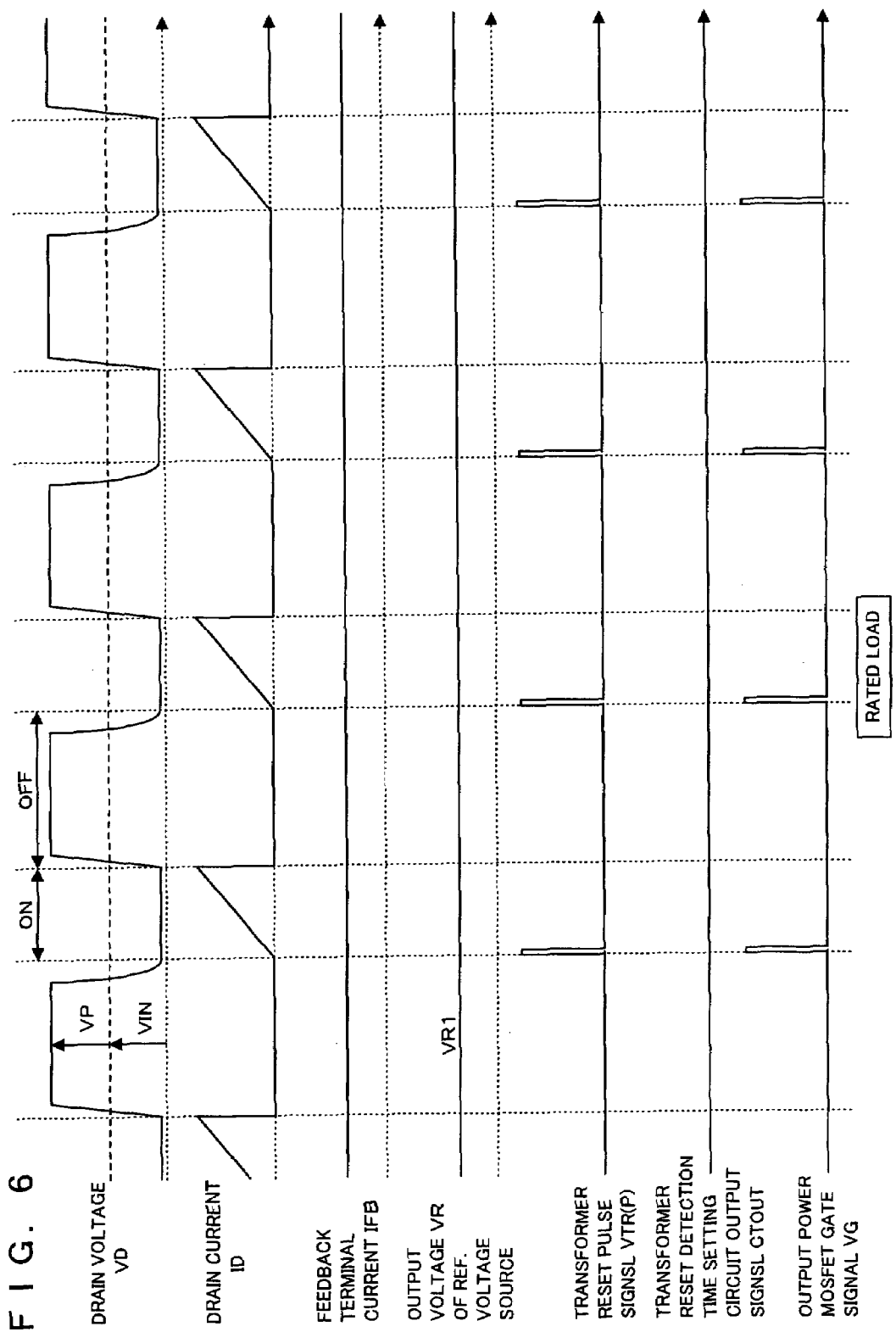
FIG. 6 is a waveform chart showing the start of switching at rated load in the semiconductor device for controlling the switching power supply of Embodiment 1.
Figure 7:
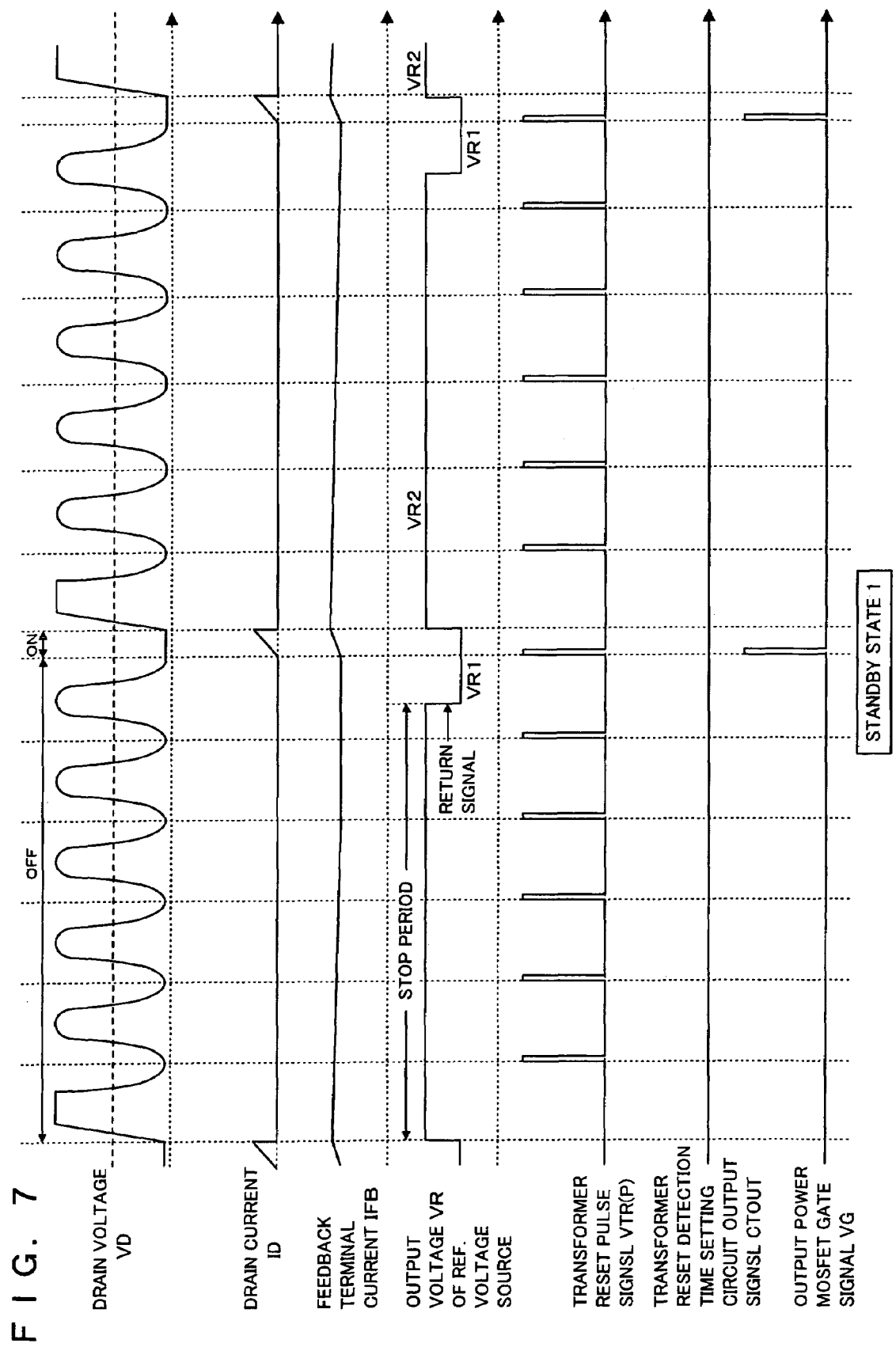
FIG. 7 is a waveform chart showing the start of switching in stand by state (1) in the semiconductor device for controlling the switching power supply of Embodiment 1.
Figure 8:
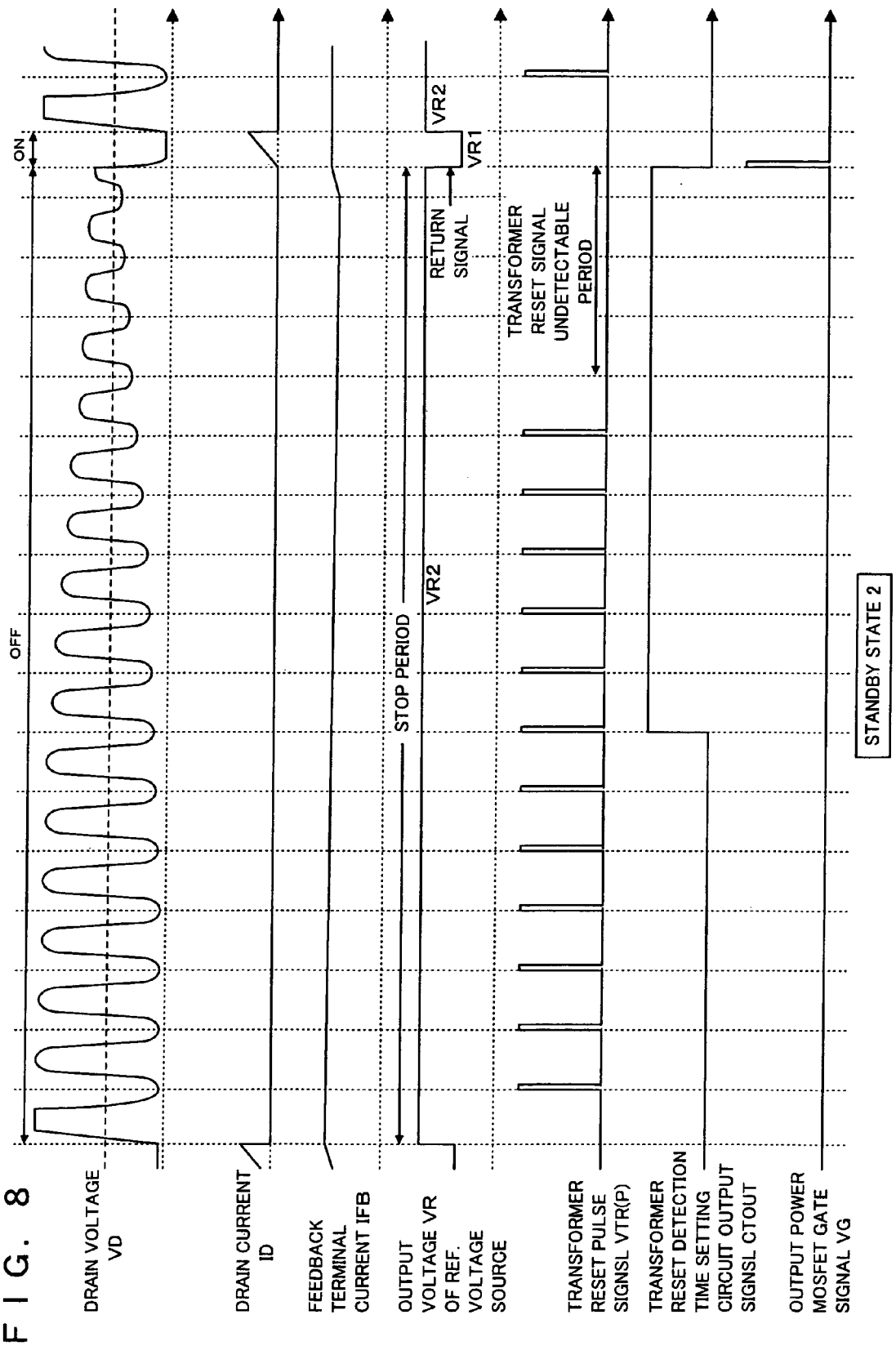
FIG. 8 is a waveform chart showing the start of switching in stand by state (2) in the semiconductor device for controlling the switching power supply of Embodiment 1.

FIG. 6 is a waveform chart showing the start of switching at rated load in the semiconductor device for controlling the switching power supply of Embodiment 1. FIG. 7 is a waveform chart showing the start of switching in standby state (1) in the semiconductor device for controlling the switching power supply of Embodiment 1. FIG. 8 is a waveform chart showing the start of switching in standby state (2) in the semiconductor device for controlling the switching power supply of Embodiment 1.

FIG. 6 shows normal artificial resonance. Since the intermittent operation is not performed, the output voltage of the reference voltage source 31 is set at VR1 and an output signal CTOUT of the transformer reset detection time setting circuit 52 is set at L level in the effective period of the transformer reset detection signal from the transformer reset detection circuit 13.

FIG. 7 shows a load state where an intermittent operation is performed with a short period from stop to return (stop period). Since the period does not reach the transformer reset detection setting time preset by the transformer reset detection time setting circuit 52, the output signal CTOUT of the transformer reset detection time setting circuit 52 is kept at L level. When a return signal is outputted, the power MOSFET 1 is turned on in response to the transformer reset detection signal (transformer reset pulse signal) inputted after the return signal. In this way, the bottom on, that is, artificial resonance is enabled even in the intermittent operation.

FIG. 8 shows that the stop period is longer than the transformer reset detection setting time preset by the transformer reset detection time setting circuit 52. In this case, since the output signal CTOUT of the transformer reset detection time setting circuit 52 is set at H level at the timing of the return signal, the power MOSFET 1 is turned on only by the return signal.

As shown in FIG. 1, the transformer reset detection time setting circuit 52 is reset by the gate signal of the switching element 1. The output state of the transformer reset detection time setting circuit 52 is kept until the transformer reset detection time setting circuit 52 is reset by the gate signal.

Regarding the transformer reset detection setting time of the transformer reset detection time setting circuit 52, the optimum setting time for a used load is determined as the effective period of the transformer reset detection signal such that the switching element 1 during the intermittent operation consumes power equal to or lower than a predetermined value based on the drain voltage waveform of the switching element 1 when the switching operation is stopped.

As described above, the intermittent switching operation and the bottom on of the drain voltage of the transformer reset detection time setting circuit can further improve the efficiency of the power supply at light load more than the conventional art.

Figure 9:
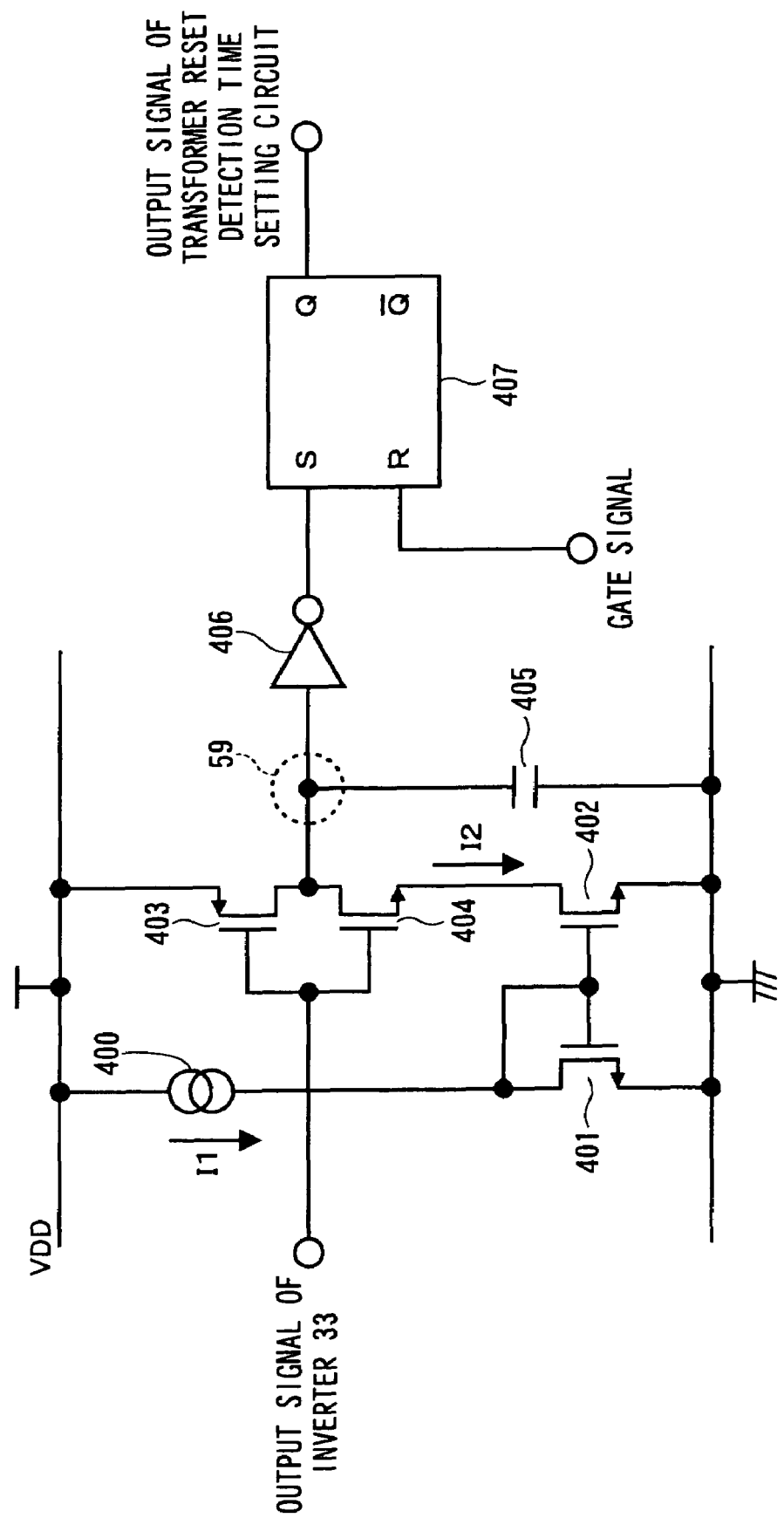
FIG. 9 is a circuit diagram showing a structural example of a transformer reset detection time setting circuit in the semiconductor device for controlling the switching power supply of Embodiment 1.

FIG. 9 is a circuit diagram showing a structural example of the transformer reset detection time setting circuit 52 in the semiconductor device for controlling the switching power supply of Embodiment 1. In FIG. 9, when the output signal of the inverter 33 is set at L, that is, not in an intermittent stop but in normal conditions, a P-type MOSFET 403 is turned on and thus the voltage of the node 59 is set at H. Hence, the output of an inverter 406 is set at L and the set signal of an RS flip-flop is set at L, so that an output Q is also set at L. Then, in an intermittent stop, the output signal of the inverter 33 is set at H and thus the set signal of an RS flip-flop 407 is set at H after a delay time expressed by formula (4) below:

$$t = C \times V \div I2 \qquad (4)$$

where V represents a threshold value at which the inverter 406 is switched from H to L and C represents a capacitance value of a capacitor 405.

I2 is expressed by formula (5) below:

$$I2 = M \times I1 \qquad (5)$$

where M represents the mirror ratio of N-type MOSFETs 401 and 402, I1 represents the current of a constant current 400, and C represents the capacitance of the capacitor 405.

As is understood from formula (4), when the capacitance of the capacitor 405 increases or the constant current I2 decreases, delay time t increases.

Embodiment 2

A semiconductor device for controlling a switching power supply will be discussed below according to Embodiment 2 of the present invention.

Figure 10:
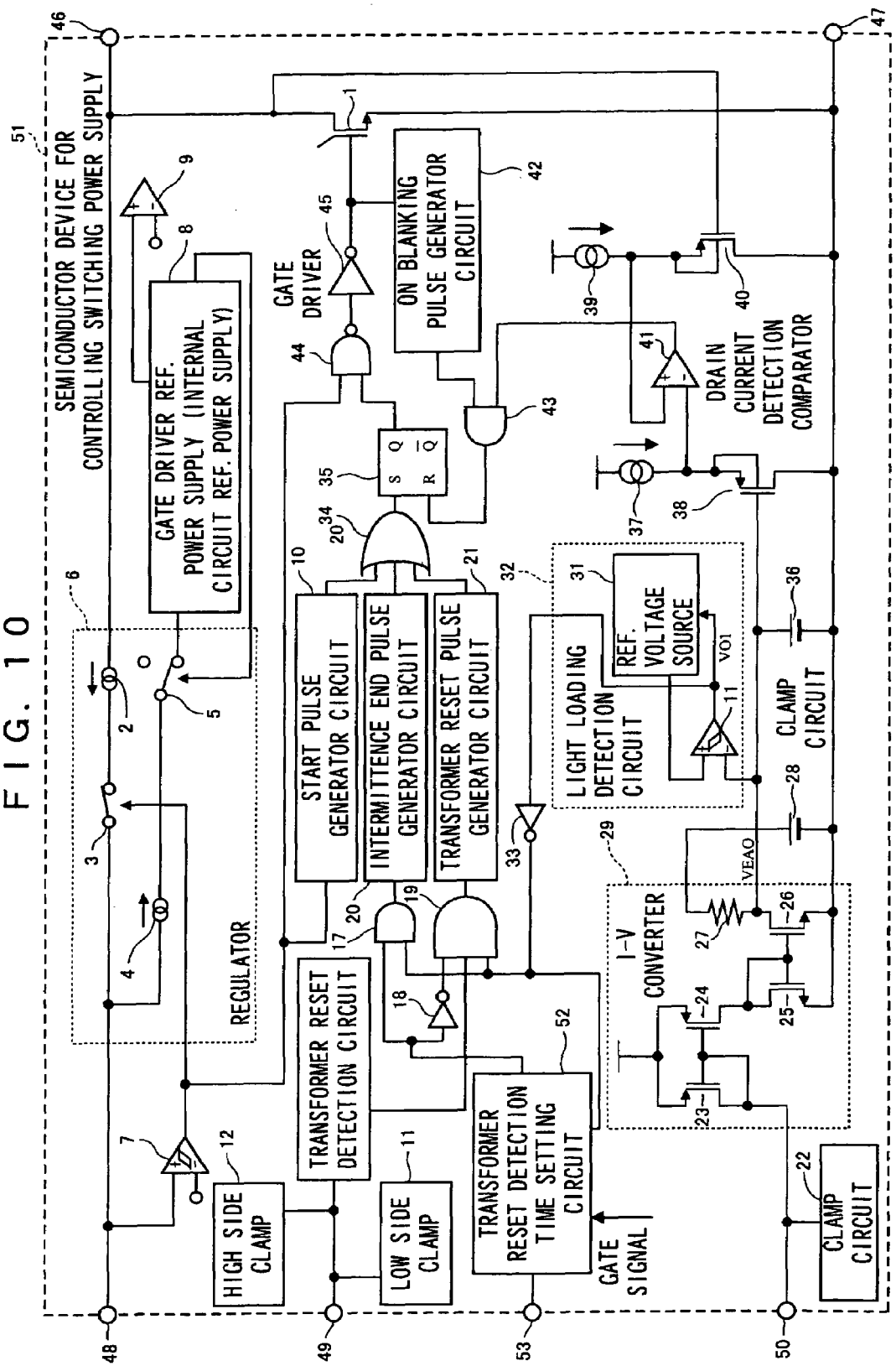
FIG. 10 is a circuit diagram showing a structural example of a semiconductor device for controlling a switching power supply according to Embodiment 2 of the present invention.
Figure 11:
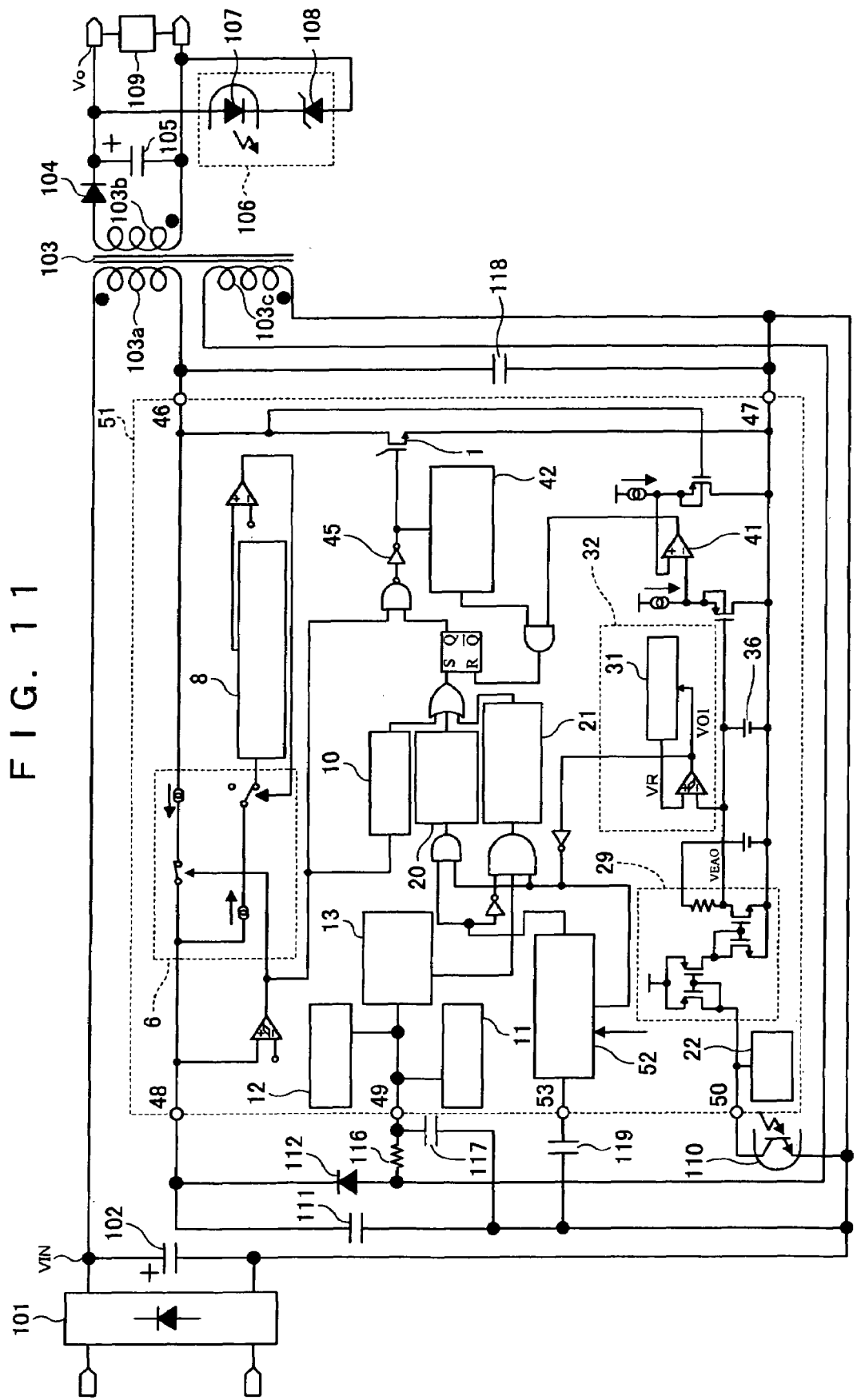
FIG. 11 is a circuit diagram showing a structural example of a switching power supply unit comprising the semiconductor device for controlling the switching power supply of Embodiment 2.

FIG. 10 is a circuit diagram showing a structural example of the semiconductor device for controlling the switching power supply of Embodiment 2. FIG. 11 is a circuit diagram showing a structural example of a switching power supply unit comprising the semiconductor device for controlling the switching power supply of Embodiment 2. The semiconductor device 51 for controlling the switching power supply comprises a terminal 53 (corresponding to a node 59 in FIG. 9) for arbitrarily setting the transformer reset detection setting time of a transformer reset detection time setting circuit 52, and an external capacitor 119 serving as setting time changing means can be connected between the terminal 53 and a ground 47. Other configurations are similar to those of the semiconductor device 51 for controlling the switching power supply shown in FIG. 1.

By changing the capacitance value of the capacitor 119 connected to the outside of the terminal 53, the optimum adjustment is possible for all standby load conditions.

In the structural example of the present embodiment, the capacitance of the external capacitor is changed and the optimum transformer reset detection time is set. An internal constant current I1 may be changed to determine the optimum time according to the constant current I1.

What is claimed is:

1. A semiconductor device comprising a switching element for controlling a switching power supply, said switching element for receiving a DC input voltage via a primary winding of a transformer, wherein a switching operation of said switching element for controlling the DC voltage is obtained by rectifying and smoothing an alternating current generated in a secondary winding of such transformer, the semiconductor device controlling the switching operation of the switching element, said semiconductor device comprising a control circuit, which further comprises:

a transformer reset detection circuit for detecting a reset state of such transformer from an alternating voltage generated in a tertiary winding of such transformer and for outputting a transformer reset detection signal indicating the reset state, the reset state being generated by the switching operation of said switching element, an IV converter for converting into a voltage a current value of a control current indicating a change of the DC voltage based on the alternating current generated in the secondary winding of such transformer, and a light load detection circuit for outputting a control signal for controlling an intermittent switching operation of said switching element when detecting a light load according to a change of an output voltage from said IV converter, wherein said switching element comprises a control electrode for receiving a signal for controlling the intermittent operation, based on the transformer reset detection signal from the transformer reset detection circuit and the control signal from the light load detection circuit, the control signal from the light load detection circuit outputs the control signal for controlling the intermittent operation and stops the switching operation of said switching element when the output voltage from the IV converter is lower than a lower limit voltage, and restarts the switching operation of said switching element when the output voltage from the IV converter is higher than an upper limit voltage, said control circuit further comprises:

a transformer reset detection time setting circuit for setting a time of an effective period of the transformer reset detection signal, starting from a stop of the switching operation in response to the control signal from the light load detection circuit, and a switching-on control unit for controlling timing of restarting the switching operation based on a relationship between the transformer reset detection setting time and the control signal from the light load detection circuit, and when the control signal indicating the restart of the switching operation is outputted from the light load detection circuit within the transformer reset detection setting time, the switching-on control unit restarts the switching operation in response to the transformer reset detection signal.

2. The semiconductor device for controlling the switching power supply according to claim 1, wherein when the control signal indicating the restart of the switching operation is outputted from the light load detection circuit after the transformer reset detection setting time, the switching-on control unit only restarts the switching operation when the control signal is outputted.

3. The semiconductor device for controlling the switching power supply according to claim 1, wherein the transformer reset detection setting time is determined as an optimum time for a load based on a drain voltage waveform of the switching operation during a stop period of the switching operation.

4. The semiconductor device for controlling the switching power supply according to claim 1, wherein a state kept after the transformer reset detection setting time is reset in response to an output signal for driving the control electrode of the switching element.

5. The semiconductor device for controlling the switching power supply according to claim 1, wherein the transformer reset detection time setting circuit sets the transformer reset detection setting time according to a capacitance value of a capacitor and outputs timing of the transformer reset detection setting time via an RS flip-flop.

6. The semiconductor device for controlling the switching power supply according to claim 1, further comprising a time changing terminal for arbitrarily setting the transformer reset detection setting time of the transformer reset detection time setting circuit.

7. The semiconductor device for controlling the switching power supply according to claim 6, further comprising a capacitor for arbitrarily setting the transformer reset detection setting time of the transformer reset detection time setting circuit, the capacitor being connected between the time changing terminal and a ground.

8. The semiconductor device for controlling the switching power supply according to claim 1, wherein the switching element and the control circuit are integrated on the same semiconductor substrate, and the semiconductor device comprises, as external connection terminals on the semiconductor substrate, at least a switching element input terminal for inputting the input voltage to the switching element via the primary winding of the transformer, a switching element output terminal for outputting a switching current obtained by the switching operation of said switching element, a power supply terminal for supplying a DC voltage to the control circuit in response to the switching operation of said switching element according to a current generated in the tertiary winding of such transformer, a control terminal for inputting a control signal for controlling an intermittent operation of switching performed by said switching element, and a transformer reset detection terminal for applying a signal for transformer reset detection to the transformer reset detection circuit.

9. The semiconductor device for controlling the switching power supply according to claim 1, wherein the DC voltage obtained by rectifying and smoothing the alternating current generated in the secondary winding of such transformer is controlled, and power is supplied to a load, by applying the DC input voltage to said switching element via the primary winding of the transformer, thereby controlling the switching element.

* * * * *